United States Patent [19]

Hirokawa

[11] Patent Number: 4,999,768
[45] Date of Patent: Mar. 12, 1991

[54] DATA TRANSFER CONTROL UNITS EACH OF WHICH COMPRISES PROCESSORS AND DUAL-PART MEMORY

[75] Inventor: Masayuki Hirokawa, Hyogo, Japan

[73] Assignee: Mitsubishi Denki Kabushiki Kaisha, Tokyo, Japan

[21] Appl. No.: 524,677

[22] Filed: May 16, 1990

Related U.S. Application Data

[63] Continuation of Ser. No. 160,031, Feb. 24, 1988, abandoned.

[30] Foreign Application Priority Data

Apr. 14, 1987 [JP] Japan ................... 62-91194

[51] Int. Cl.⁵ ............... G06F 13/16; G06F 13/38; G06F 15/16
[52] U.S. Cl. .................... 364/200; 364/228; 364/228.3; 364/228.5; 364/229; 364/239.2; 364/239.9; 364/243.3; 364/244.8; 364/244.6
[58] Field of Search ... 364/200 MS File, 900 MS File

[56] References Cited

U.S. PATENT DOCUMENTS

| | | | |
|---|---|---|---|
| 4,309,754 | 1/1982 | Dinwiddie, Jr. | 364/200 |
| 4,363,093 | 12/1982 | Davis et al. | 364/200 |
| 4,451,884 | 5/1984 | Heath et al. | 364/200 |
| 4,454,595 | 6/1984 | Cage | 364/900 |
| 4,462,075 | 7/1984 | Mori et al. | 364/200 |
| 4,641,238 | 2/1987 | Kneib | 364/200 |
| 4,700,292 | 10/1987 | Campanini | 364/200 |
| 4,724,520 | 2/1989 | Athanas et al. | 364/200 |
| 4,751,648 | 6/1988 | Sears, III et al. | 364/900 |
| 4,764,896 | 8/1988 | Freimark et al. | 364/900 |
| 4,773,043 | 9/1988 | Kesler | 364/900 |
| 4,796,232 | 1/1989 | House | 364/900 |

OTHER PUBLICATIONS

"Dual Port Dynamic RAM Controller", Intel, 10/86.
"16-Bit MC68000 Microprocessor User's Manual", Motorola Semiconductors Japan Inc. (1981).

Primary Examiner—Thomas C. Lee
Assistant Examiner—Emily Y. Chan
Attorney, Agent, or Firm—Townsend and Townsend

[57] ABSTRACT

A data transfer control unit for completing data transfer between two systems using data transfer interfaces equipped with a controller, a serial I/O interface, and a dual port RAM. The controller is dedicated to controlling interfacing between the system and an outside source. Writing data from the outside source into the dual port memory is indicated by an internal flag. When this flag is set, it indicates that data has been loaded and needs to be moved to the system RAM.

4 Claims, 4 Drawing Sheets

DATA TRANSFER CONTROL UNITS EACH OF WHICH COMPRISES PROCESSORS AND DUAL-PART MEMORY

This is a continuation of application Ser. No. 160,031, filed Feb. 24, 1988, now abandoned.

BACKGROUND OF THE INVENTION

The present invention relates to a data transfer control unit for transferring data between two systems. More particularly, the invention relates to data transfer control for serial data transfer.

FIG. 4 shows a block diagram of two data transfer control units 1, 1A, each for performing serial data transfer. Control units 1, 1A show systems respectfully performing their operation under any different CPU. A data signal line 2 is used to conduct serial communication between the two systems. A control signal line 3 is used to control the communication.

The system of FIG. 4 also includes CPUs 4, 4A, and ROMs 5, 5A, which hold a program dedicated for running control units 1, 1A. RAMs 6, 6A hold programs and data during operation in addition to the program to be held in ROMs 5, 5A. Serial input/output (I/O) interfaces 7, 7A are used to perform communication between systems 1. 1A. Other I/O interfaces 8, 9 are used to connect peripheral equipment such as a keyboard and a CRT. System buses 10, 10A are used to send out address signals, data signals, and control signals such that CPUs 4, 4A will be connected by serial I/O interfaces 7, 7A.

The operation of the system of FIG. 4 will now be explained. Control units 1, 1A are capable of stand-alone operation according to the programs which are held in ROMs 5, 5A. CPUs 4, 4A load the program from ROMs 5, 5A of the other CPU through system buses 10, 10A. These programs are written in RAMs 6, 6A as needed during execution of the program. In addition, the states of I/O interfaces 8, 9 are monitored via system buses 10. 10A which are processing in response to each state. When exchanges of information are required between systems 1, 1A CPUs 4, 4A will exchange the information through serial I/O interfaces 7, 7A.

When information from one system is to be transferred to the other system, CPU 4 begins checking the feasibility of transmitting from the serial I/O interface 7. In case transmission cannot be accomplished, CPU 4 waits until the system is ready. When the system is ready the opposing CPU is signaled by the CPU of the first control unit on control line 3. The control signal is transmitted to the opposing CPU at serial I/O interface 7.

Serial I/O interface 7 receives the command from CPU 4 and outputs the data on data signal line 2. When serial I/O interface 7A of the other system 1A receives the data, it either informs CPU 4A that data signals are to be interrupted by means of interrupt signals or sets the internal flag. Once CPU 4A has received an interrupt signal or an internal flag has been set. CPU 4A reads the information from system 1 by means of serial I/O interface 7A. This information will be held in RAM 6A for later processing.

In case a plurality of data is sent, this process is repeated. Additionally, the sending of data from system 1A to system 1 will follow the same procedure.

The traditional data transfer is completed as discussed above. During data transfer CPUs 4, 4A of each system 1, 1A will be unavailable for processing information received by I/O interfaces 8, 9 of each system. As a result, the time required for effecting communication between the systems incorporating serial I/O interfaces 7, 7A can become quite substantial. In performing large quantities of data information exchange there have been problems loading host CPUs to the extent that large processing capability is required for CPUs 4, 4A.

SUMMARY OF THE INVENTION

A first object of the present invention is to implement a data transfer control unit wherein the load of the CPU is reduced when transferring data.

A second object of the present invention is to unilaterally transfer data from one CPU to an outside source. The present invention intends to transfer data by using a dual port memory and reading the data written into the dual port memory from a CPU.

Other objects, features, and advantages of the invention will be apparent from the following description taken in conjunction with the accompanying drawings.

DESCRIPTION OF THE PREFERRED EMBODIMENT

Figure 1:
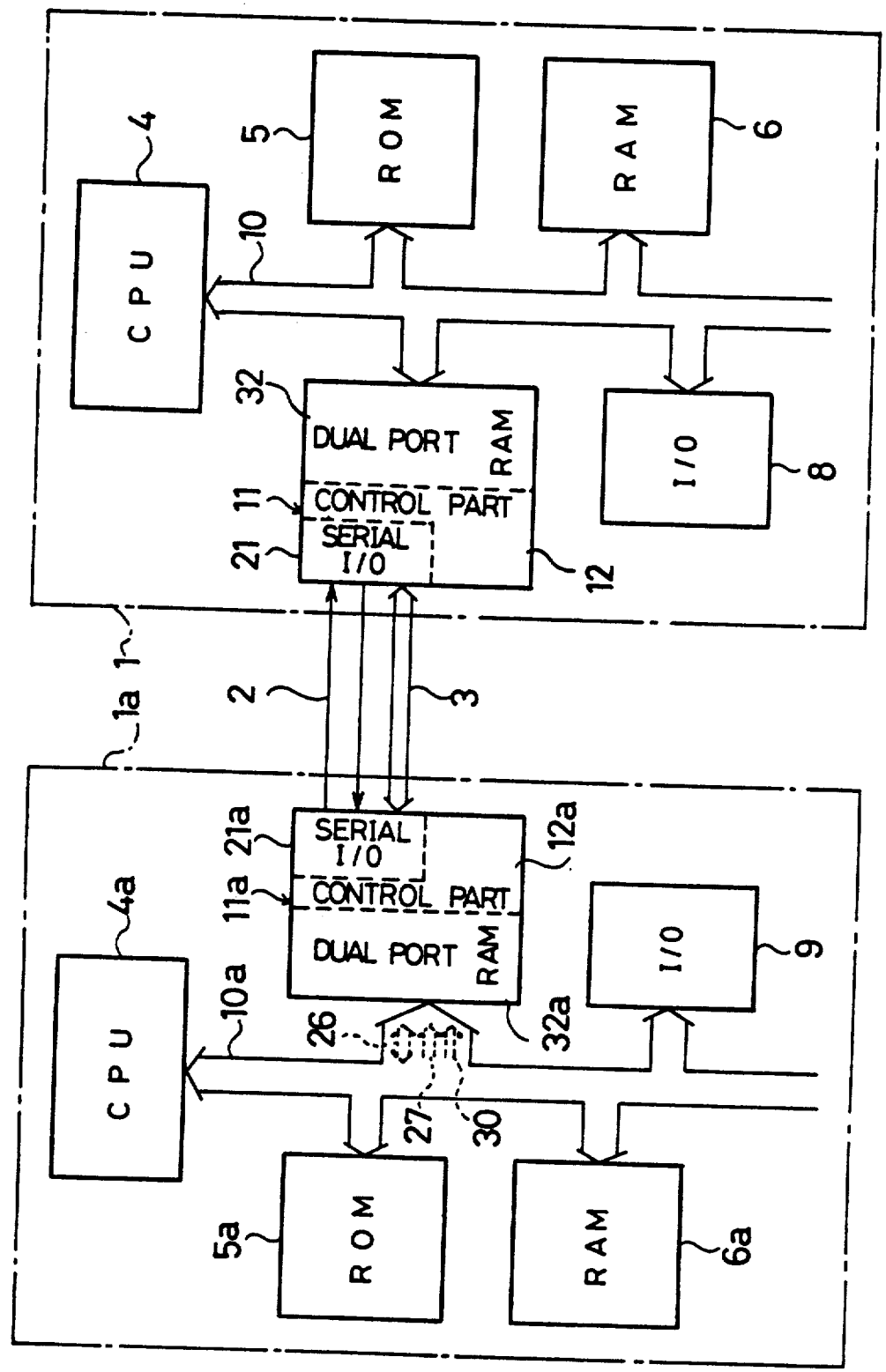
FIG. 1 shows a block diagram of a data transfer control unit.

FIG. 1 is a block diagram of a data transfer control unit in one embodiment of the present invention. Throughout the drawings like reference numerals shall denote similar components which are referred to in the various drawings.

The data transfer interfaces 11, 11A consist of serial I/O interfaces 21, 21A, dual port RAMs 32, 32A, and control parts 12, 12A.

Figure 2:
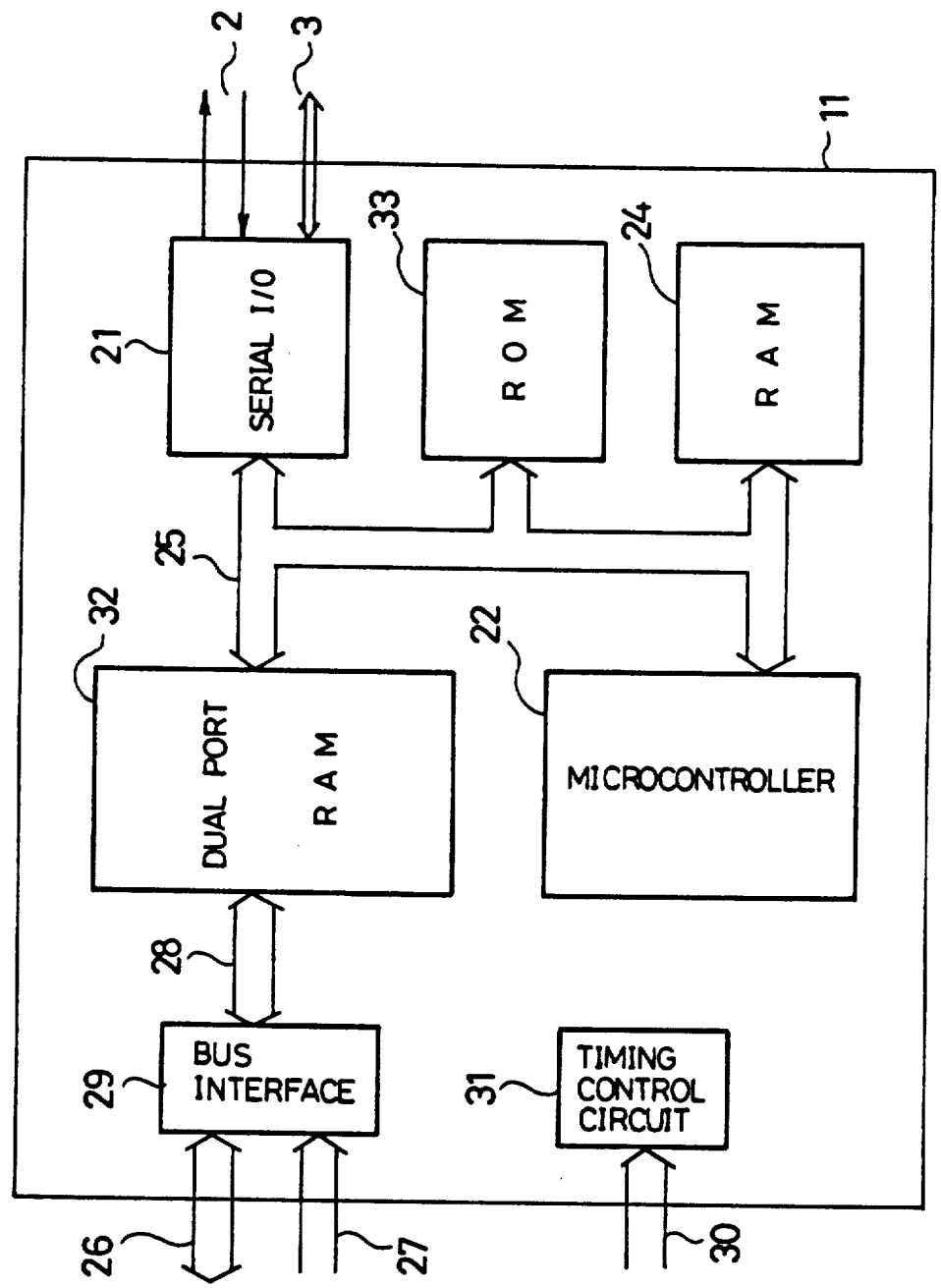
FIG. 2 shows a detailed block diagram of a data transfer interface.

FIG. 2 shows a detailed block diagram of a data transfer interface 11. Serial I/O interface 21 conducts communication. A microcontroller 22, consisting of a CPU, controls serial I/O interface 21. A ROM 33 holds the program of microcontroller 22. RAM 24 is used when controlling the data transfer according to the program held in ROM 33. An internal system bus 25 is used for sending control signals, address signals, and data signals out of microcontroller 22 to the various system components.

An external address data bus 26 communicates data signals and address signals to and from an outside source. A host control bus 27 is connected between a bus interface 29 and an outside source. A host system bus 28 correlates the external signals to the internal timing and the bus interface 29 is used for setting up timing.

A timing control circuit 31 controls the internal operation of data transfer interface 11 based on the signals received on system control bus 30. A dual port RAM 32 enables access from both host system bus 28 and internal system bus 25.

The operation of this particular embodiment of the invention will now be explained. In FIG. 2, when microcontroller 22 is enabled, it loads the program from ROM 33 through the internal system bus 25. The program is then executed by microcontroller 22.

Serial I/O interface 21 can be set to a transmit or receive mode during operation. Below is a separate explanation of the transmitting and receiving modes.

In receiving mode, microcontroller 22 polls serial I/O interface 21 to determine whether serial I/O interface 21 has completed reception of data. In the alternative, microcontroller 22 may be interrupted by interrupt signals transmitted by serial I/O interface 21.

Once microcontroller 21 recognizes that data has been received, this data is transmitted through internal system bus 25 to RAM 24 or directly transferred to dual port RAM 32. If data is transmitted to RAM 24' preprocessing is performed upon the received data. Transfer of the data can then be made to dual port RAM 32. If data is read from an outside source, it is necessary to read the contents of dual port RAM 32 through host address data bus 26 and host control bus 27.

In transmitting mode, data requiring transmitting to an outside source is written through host address data bus 26 and host control bus 27. When internal microcontroller 22 recognizes that the transferred data has been written into the dual port RAM 32, it waits until serial I/O interface 21 has reached a state enabling it to transmit data.

When serial I/O interface 21 enters the transmit state, the transferred data is moved from dual port RAM 32 through internal system bus 25 to serial I/O interface 21.

In case a plurality of data requires transmission, the above-described procedure is repeated. The sequence of transmitting and receiving is described in the program held in ROM 33.

A further explanation covers the detail of the operation of the present invention. In FIG. 1, the systems 1, 1A independently operate pursuant to the program held in ROMS 5, 5A. CPUs 4, 4A load the program from ROMs 5, 5A through system buses 10, 10A. If necessary, CPUs 4, 4A may read/write from or to RAMS 6, 6A.

Additionally, CPUs 4, 4A monitor the status of I/O interfaces 8, 9 through system buses 10, 10A. A particular process is implemented in response to each change in status. When synchronization and exchange of information are required between systems 1, 1A, CPUs 4, 4A use the data transfer interfaces 11, 11A.

In case transmission of data is required, it is necessary to unilaterally write the data to be transmitted to dual port RAMS 32, 32A of data transfer interfaces 11, 11A. In case reception is required, it is necessary to read the data from dual port RAMs 32, 32A.

Complicated processes such as synchronization between the serial I/O interfaces 21, 21A. synchronization of a plurality of data transmissions and receptions, etc. are completed by internal control parts 12, 12A.

Figure 3:
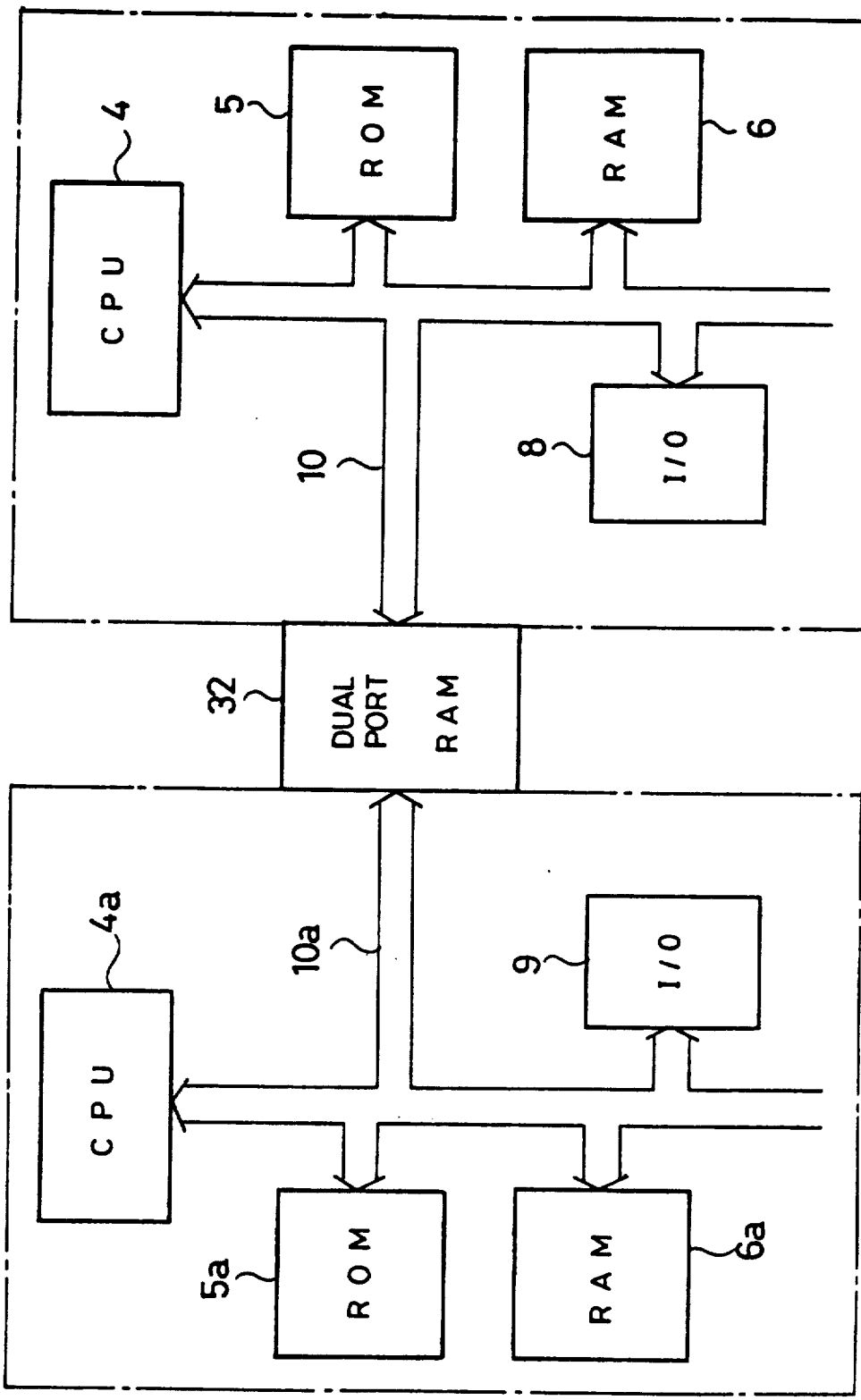
FIG. 3 shows a block diagram indicating the effects of a data transfer control unit: and, FIG. 4 shows a block diagram of a traditional data transfer control system.
Figure 4:
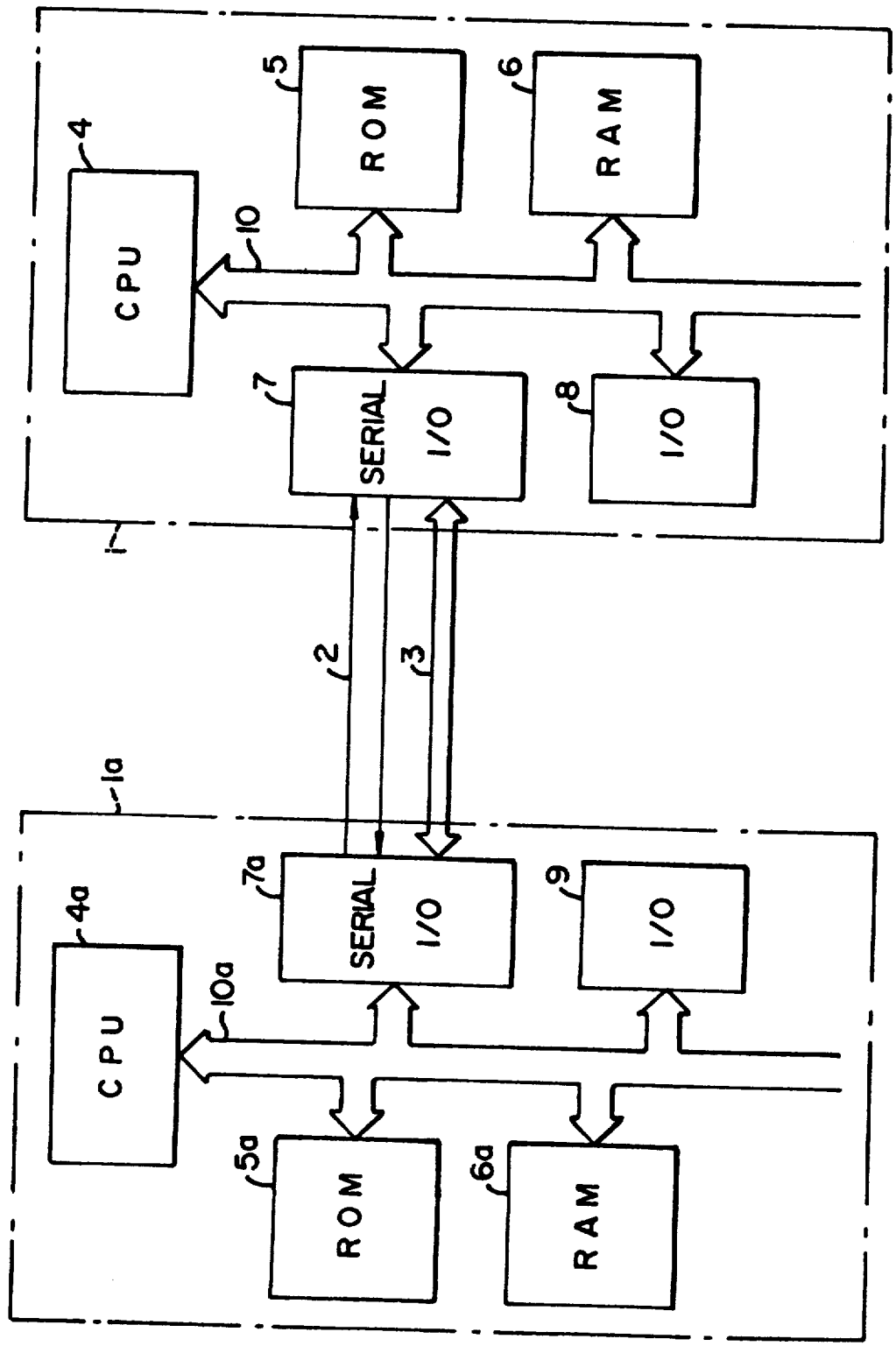

FIG. 3 illustrates two control units connected together by a single dual port RAM 32. This embodiment produces the same results for data transfer between two control units as those produced if two dual port RAMs 32 were used.

In the present embodiment, data transfer has been reassigned from the host CPU to the data transfer interfaces 11, 11A. This allows the load of the host CPU to be sharply reduced. Before, the complicated processes of synchronization of the serial I/O interfaces between systems and synchronization of data transmission and reception were done by the host CPU.

Moreover, all that is necessary is for the host CPU to unilaterally write the data into the dual port memory, resulting in the CPU being left to carry out data transfer. In addition, in the above embodiment including serial I/O interfaces there is the option to perform parallel data transfer by converting to a parallel I/O interface.

While the above embodiment shows a conventional CPU as the microcontroller in a configuration for controlling data transfer pursuant to the program written into ROM, a reconfiguration using custom LSI may also be implemented.

The above embodiment shows the internal RAM 24 of data transfer interface 11 separated from dual port RAM 32. It is also possible to combine the two RAMS 24, 32 in a common unit.

While a preferred embodiment of the invention has been described using specific terms, such description is for illustrative purposes only. It is to be understood that changes and variations may be made without departing from the scope of the following claims.

What is claimed is:

1. A data transfer control system including a plurality of transfer control units capable of transferring data directly between themselves and between one of the transfer control units and an outside source, comprising:
   a first transfer control unit including,
      a first processor for controlling operations within said first transfer control unit;
      a first data transfer interface, connected to said first processor by a first system bus, said first data transfer interface for interfacing said first transfer control unit with other individual transfer control units in the plurality of transfer control units and said first transfer control unit with an outside source, said first data transfer interface including,
         a second processor for controlling the transfer of data into and out of said first data transfer interface;
         a first input/output interface unit for interfacing said first transfer control unit with another one of the plurality of transfer control units;
         a first bus interface connected to said first system bus for interfacing said first data transfer interface to said first processor; and
         a first dual port memory having a dual port configuration including a first port and a second port, wherein said first dual port memory stores information and transfers information between said first transfer control unit and another one of the plurality of transfer control units through said first port and said first I/O interface unit or an outside source through said second port and said first bus interface;
   a second transfer control unit including,
      · a third processor for controlling operations within said second transfer control unit;
      a second data transfer interface, connected to said third processor by a second system bus, said second data transfer interface for interfacing said second transfer control unit with other individual transfer control units in the plurality of transfer control units, including said first transfer control unit, and said second transfer control unit with an outside source, said second data transfer interface including, a fourth processor for controlling the transfer of data into said second transfer control unit from said first transfer control unit or an outside source and from said second data transfer interface to said first transfer control unit, another one of the plurality of transfer control units or an outside source;

a second input/output (I/O) interface unit for interfacing said second transfer control unit with said first transfer control unit or another one of the plurality of transfer control units;

a second bus interface connected to said second system bus for interfacing said second data transfer interface to said third processor; and a second dual port memory having a dual port configuration including a third port and a fourth port, wherein said second dual port memory stores information and transfers information between said second transfer control unit and said first transfer control unit or one of the other plurality of transfer control units through said third port and said second I/O interface unit, or an outside source through said fourth port and said second bus interface.

2. The transfer control units of claim 5, further comprising a read only memory (ROM), connected to said second processor which stores a program for operating said second processor.

3. The transfer control units of claim 5, further comprising a random access memory (RAM), connected to said second processor for storing data received by said first data transfer interface.

4. The transfer control units of claim 5 wherein said first and second I/O interface units further comprise a parallel to serial converter such that data stored in parallel form in said first and second dual port memories is transmitted from said first and second data transfer interfaces in serial form through said first and second I/O interface units respectively.

* * * * *

UNITED STATES PATENT AND TRADEMARK OFFICE
CERTIFICATE OF CORRECTION

PATENT NO. : 4,999,768
DATED : March 12, 1991
INVENTOR(S) : Masayuki Hirokawa It is certified that error appears in the above—identified patent and that said Letters Patent is hereby corrected as shown below:

On the title page, Item[54] and Column 1, line 1,
    The title should read:

--DATA TRANSFER CONTROL UNITS EACH OF WHICH
    COMPRISES PROCESSORS AND DUAL-PORT MEMORY--

Col. 2, lines 29 and 31, ":" should be --;--.

Col. 3, line 15, "24'" should be --24--.

Col. 6, lines 6, 10 and 14, "claim 5" should be --claim 1--.

Signed and Sealed this

Twenty-fourth Day of August, 1993

*Attest:*

BRUCE LEHMAN

*Attesting Officer*      *Commissioner of Patents and Trademarks*